United States Patent [19]
Morgan

[11] 4,201,411
[45] May 6, 1980

[54] TAILGATE CONSTRUCTION

[76] Inventor: Homer R. Morgan, 2765 Townley Cir., Doraville, Ga. 30340

[21] Appl. No.: 961,696

[22] Filed: Nov. 17, 1978

Related U.S. Application Data

[62] Division of Ser. No. 843,804, Oct. 20, 1977, Pat. No. 4,136,905.

[51] Int. Cl.² .................. B62D 39/00; B62D 35/00
[52] U.S. Cl. ................................. 296/50; 296/15; 49/381
[58] Field of Search ................ 296/50, 15; 49/381, 49/501; 180/68 P

[56] References Cited

U.S. PATENT DOCUMENTS

| D. 250,014 | 10/1978 | Jensen | D12/196 |
| 2,276,279 | 3/1942 | Asklund | 180/68 D |
| 3,148,912 | 9/1964 | Curtis et al. | 296/50 |
| 3,600,032 | 8/1971 | Gross | 296/50 |
| 4,063,772 | 12/1977 | Kincaid | 296/50 |

Primary Examiner—Richard A. Bertsch
Attorney, Agent, or Firm—B. J. Powell

[57] ABSTRACT

A tailgate construction for pickup trucks and other vehicles which permits the passage of air therethrough to reduce the drag on the vehicle associated with the tailgate construction when the vehicle is in use and thus increase the gas mileage of the vehicle. Also disclosed is a shutter mechanism for selectively preventing the passage of air through the tailgate construction.

11 Claims, 10 Drawing Figures

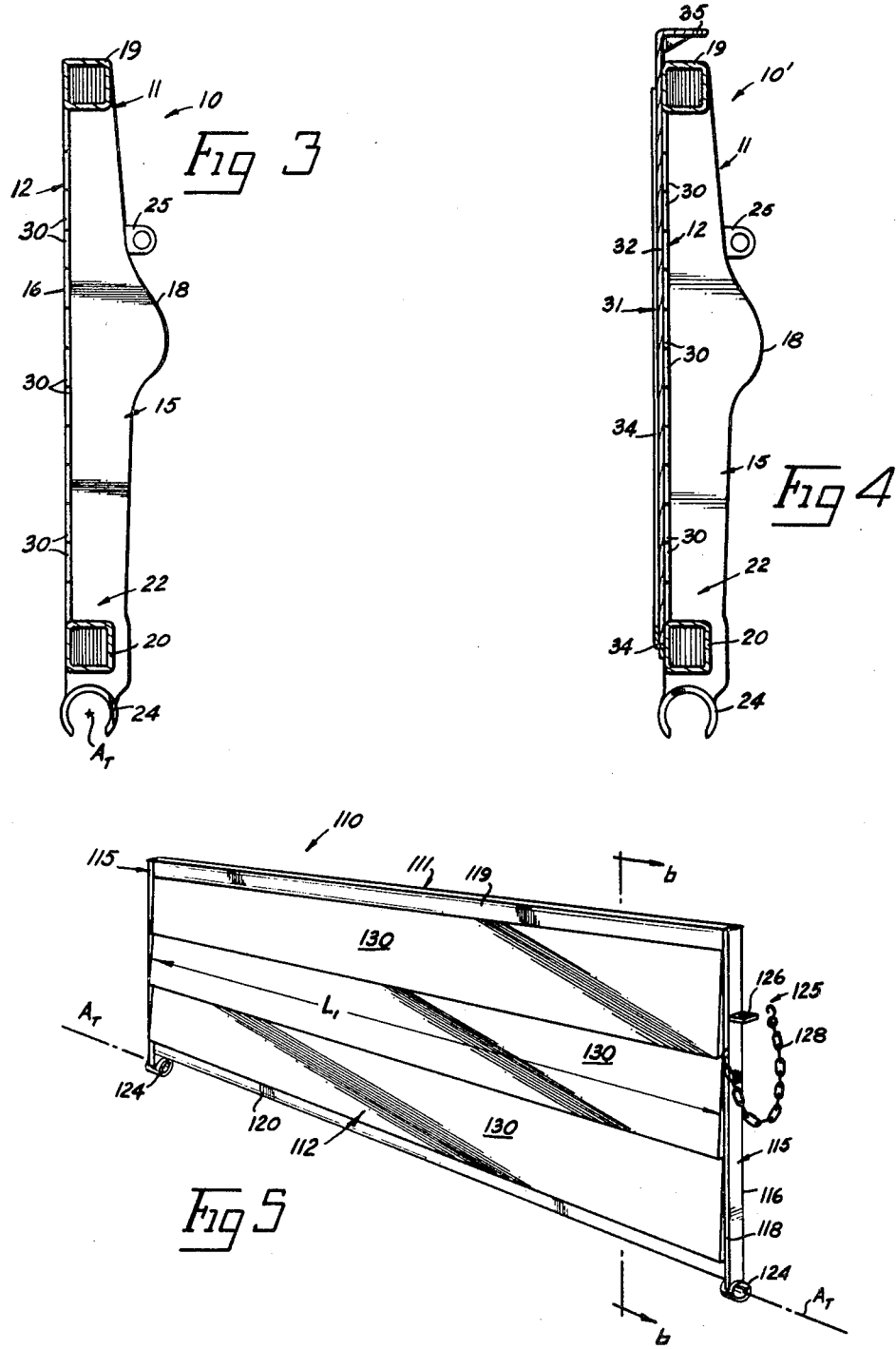

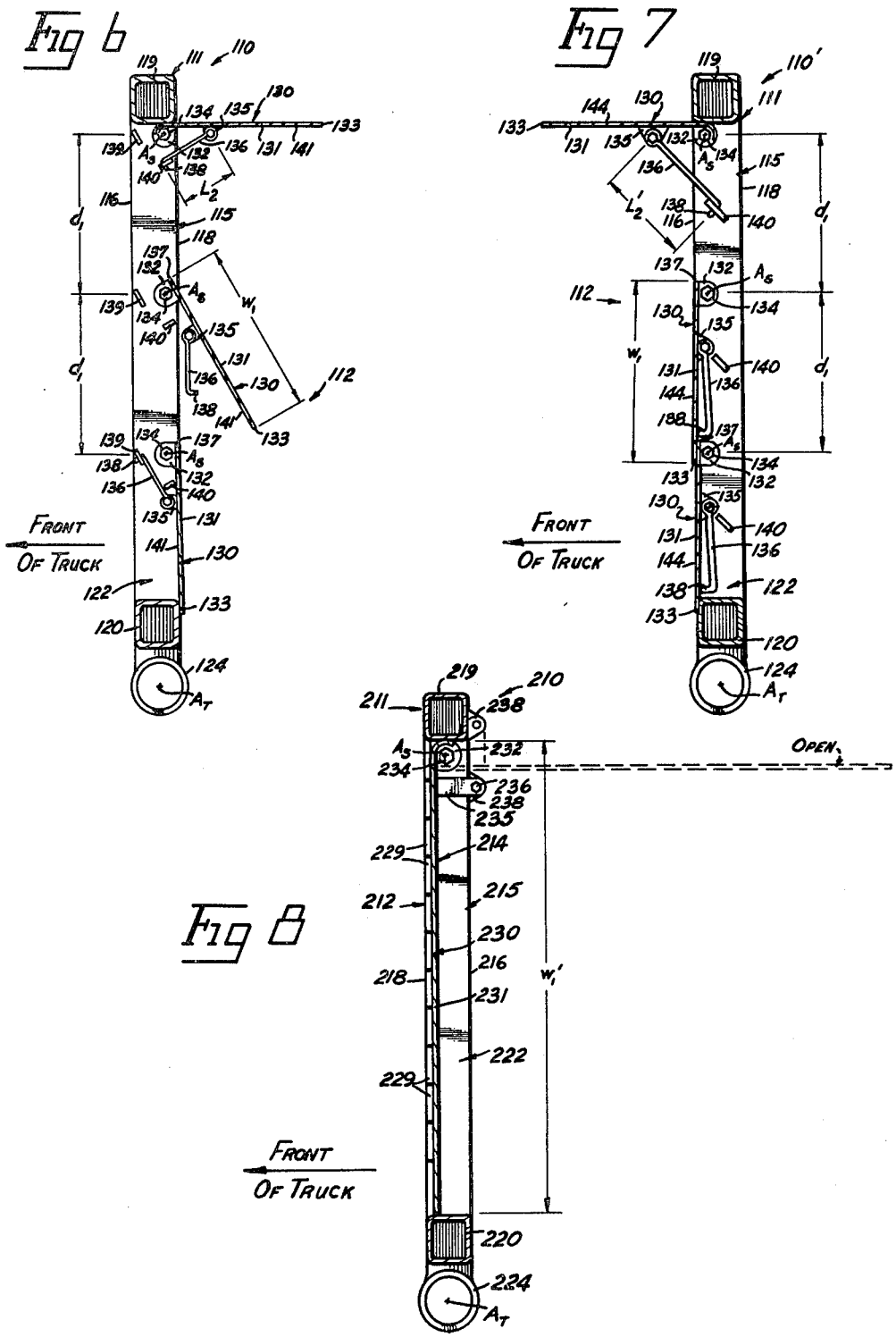

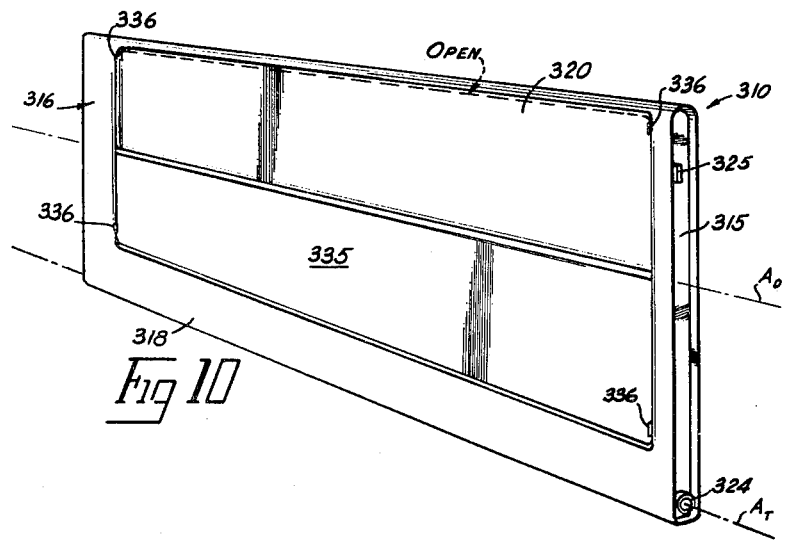
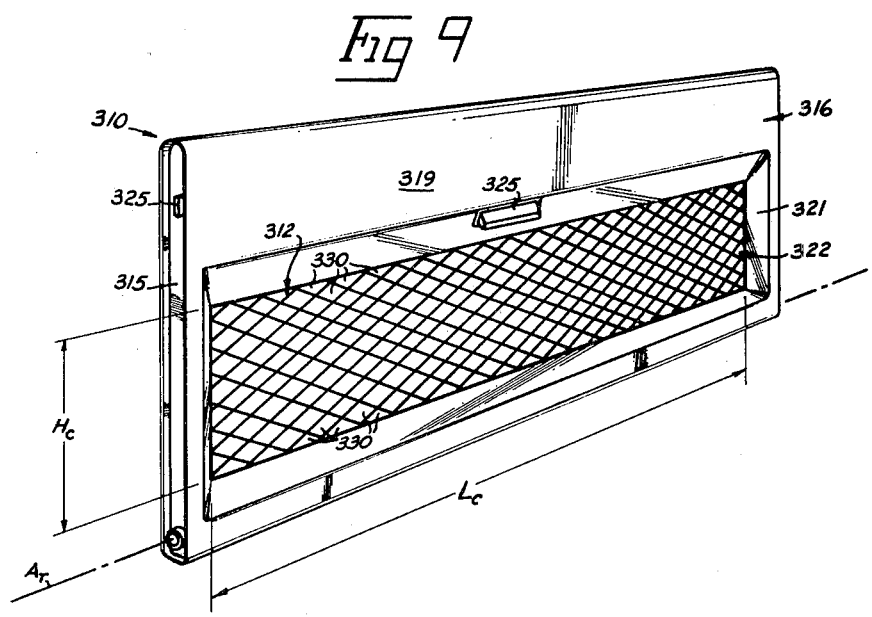

TAILGATE CONSTRUCTION

This application is a division of my co-pending application Ser. No. 843,804, filed Oct. 20, 1977, now U.S. Pat. No. 4,136,905.

BACKGROUND OF THE INVENTION

A number of vehicles have an open top cargo compartment which is closed at its rear end by a tailgate that can be opened to permit access to the cargo compartment. Some examples are pickup trucks and various trailers which have an open top. Many of these vehicles are driven for significant distances with the cargo compartment empty or very lightly loaded. This is especially true with pickup trucks where their primary use is for passenger transportation while their use for the transportation of cargo is only incidental. These vehicles, by in large, have the rear end of the open top cargo compartment closed by solid tailgates which form an integral part of the cargo bed structure and thus need to be closed when the vehicle is in operation. Because of this, these vehicles are frequently driven with the solid tailgates in the closed position. This causes the tailgate to operate as an airbrake which significantly increases the air drag on the vehicle. The net result is a significant loss in fuel economy because of the power consumed in overcoming this air drag resistance.

SUMMARY OF THE INVENTION

These and other problems and disadvantages associated with the prior art are overcome by the invention disclosed herein by a tailgate construction which can be operated in its closed position to maintain the structural integrity of the bed structure of the vehicle while at the same time permitting the air to freely flow therethrough to substantially eliminate the air drag normally associated with prior art tailgate constructions. The invention also provides for a tailgate construction which has two operative positions so that the tailgate can present a solid surface to cargo when it is being transported in the cargo compartment and which can also be operated to allow the air to freely pass therethrough when it is not loaded with cargo to reduce the air drag resistance associated therewith.

The tailgate construction of the invention is designed for replacement of the tailgate constructions normally associated with pickup trucks and other similar vehicles which have an open top cargo compartment defined in the bed of the vehicle. The tailgate construction includes an open frame having a peripheral configuration complimentary to the peripheral configuration of the conventional tailgate construction associated with the bed of the vehicle. The open frame defines a large opening therethrough and closure member is mounted on the open frame with air passages therethrough so that the air can freely pass through the closure member to reduce the air drag resistance associated with the tailgate construction. The individual air passages are sufficiently small in size to limit pieces of cargo from passing therethrough. One embodiment of the tailgate construction uses a cover made out of expanded metal screening. Another embodiment of the tailgate construction uses a shutter which can be opened to allow the air to pass freely therethrough or closed to present a substantially solid surface to cargo being carried in the cargo carrying space in the bed of the vehicle.

These and other features and advantages of the invention will be more clearly understood upon consideration of the following specifications and accompanying drawings wherein like characters of reference designate corresponding parts through the several views in which:

BRIEF DESCRIPTION OF THE DRAWINGS

FIG. 3 is a vertical cross sectional view taken generally along line 3—3 in FIG. 2;

FIG. 4 is a vertical cross sectional view similar to FIG. 3 showing a modification of the tailgate construction of FIG. 3;

FIG. 5 is a perspective view illustrating a second embodiment of the invention;

FIG. 6 is a vertical cross sectional view taken generally along the line 6—6 in FIG. 5;

FIG. 7 is a vertical cross sectional view taken similarly to FIG. 6 showing a modification to the tailgate construction of FIG. 6;

FIG. 8 is a vertical cross sectional view taken similar to FIG. 6 showing a second modification of the tailgate construction of FIG. 6;

FIG. 9 is a perspective view of a third embodiment of the invention; and

FIG. 10 is a perspective view of the opposite side of the tailgate construction of FIG. 9.

These figures in the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
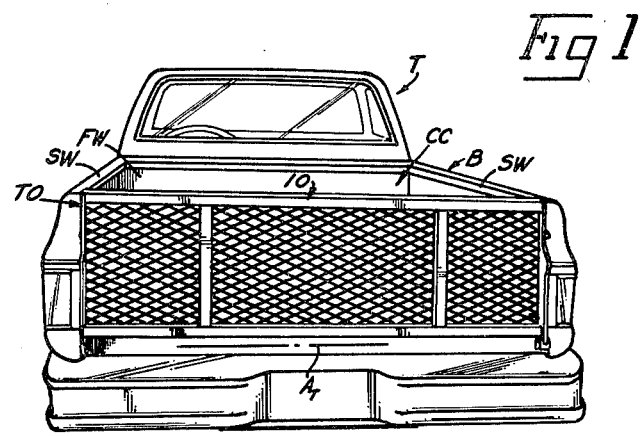
FIG. 1 is a perspective view illustrating the invention installed on a pickup truck.
Figure 2:
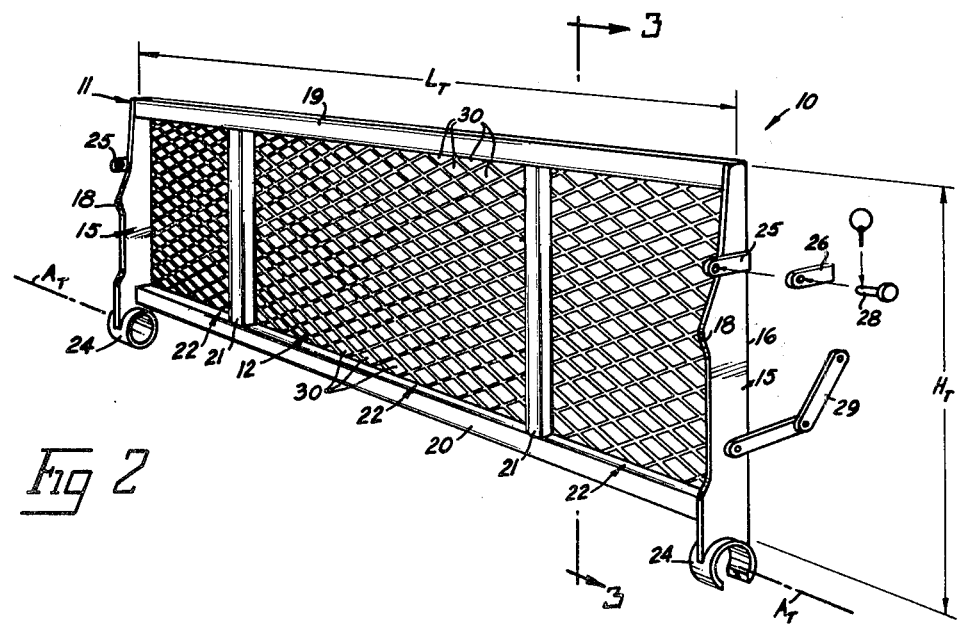
FIG. 2 is an enlarged perspective view of the first embodiment of the invention as seen in FIG. 1.

Referring to the figures, it will be seen that the invention is designed for use on a pickup truck T or other similar vehicle which has a cargo compartment CC defined in the vehicle bed B. The vehicle bed B has a front wall FW and a pair of spaced apart side walls SW connected to the front wall at their front ends and are open at their rear ends with a tailgate opening TO. The tailgate construction of the invention is designed to be pivotally mounted in the tailgate opening TO at the rear end of the bed B between the rear ends and the side walls SW to selectively close the tailgate opening TO and retain cargo in the cargo compartment CC. The tailgate construction of the invention permits the air flowing thereagainst when the truck is in motion to pass through the tailgate construction to significantly reduce the air drag of this tailgate construction over the prior art, especially when the cargo space is empty or lightly loaded. This results in significantly improved fuel economy in the operation of the vehicle. The first embodiment of the tailgate construction is illustrated in FIGS. 1-3 and has been designated generally by the numeral 10. Referring generally to FIGS. 2 and 3, it will be seen that the tailgate construction 10 includes a generally rectilinear open frame 11 which is pivotally mounted on the vehicle bed B at the rear ends of the side walls SW to selectively close the tailgate opening TO as seen in FIG. 1. The frame 11 is covered by an air permeable cover 12 which permits the air to pass freely therethrough as will become more apparent.

The open frame 11 seen in FIGS. 2 and 3 includes a pair of spaced apart, generally vertically extending end plates 15 which have a peripheral contour corresponding generally to the cross sectional contour of the ends of the side walls SW at the tailgate opening TO. Usually, the forward edges 16 of the end plates 15 are straight while the trailing edges 18 are contoured to match the exterior truck body contour where the body meets the ends of the tailgate construction 10. Upper and lower tubular edge members 19 and 20 extend respectively between the upper ends of the end plates 15 and just upwardly of the lower ends of the end plates 15 so that the end plates 15 are generally parallel to each other while the upper and lower edge members 19 and 20 are generally parallel to each other. Intermediate braces 21 may extend generally vertically between the upper end and lower edge members 19 and 20 intermediate their ends as seen in FIGS. 1 and 2. Thus, it will be seen that the frame 11 is a skeletal design with large openings 22 formed between the frame components with the end plates 15, upper and lower edge members 19 and 20, and intermediate braces 21 presenting very little frontal area to the air flow thus reducing air drag to a minimum as the truck moves down the road. While the frontal width of the frame components may be varied, end plates with a frontal width of about $\frac{1}{4}$ inch, and edge members and braces with a frontal width of about $1\frac{1}{4}$ inch have been found satisfactory. The frame 11 has a length $L_T$ and a height $H_T$ corresponding to the size of the tailgate opening TO. The length $L_T$ is usually in the range of 65–72 inches while the height $H_T$ is in the range of 18–24 inches.

The lower ends of each end plates 15 is provided with a pivot connector 24 which pivotally connects the open frame 11 to the tailgate mounting brackets on the truck T. It will be understood that pivot connectors 24 may be different for different manufactures of trucks. For instance, the pivot connectors 24 illustrated are for use on pickup trucks manufactured by General Motors Corp. where one of the pivot connectors has a slot through it so that the tailgate can be removed without having to remove the pivot brackets holding the tailgate on the truck. Thus, it will be seen that the pivot connectors 24 pivotally connect the tailgate construction 10 to the pickup truck T in the tailgate opening TO at the rear end of the side walls SW so that the tailgate pivot axis $A_T$ lies along the same pivot axis that a conventional tailgate is pivoted about on the truck T. An appropriate catch member 25 is provided on each of the end plates 15 for use in holding the tailgate construction 10 in a closed position. A catch member 26 may be added to the truck at the tailgate opening TO to cooperate with the tailgate catch members 25 so that the tailgate can be held in a closed position. An appropriate pin or other mechanism may be provided for interconnecting the catch members 25 and 26. Also, an appropriate locating mechanism 29 may be used to connect end plates 15 to the truck at the tailgate opening TO so as to hold the tailgate construction 10 generally horizontal when it is open. The locating mechanism 29 may be a pair of links pinned together or a chain. The catch member 25 and the locating mechanism 29 may be made to cooperate with the existing tailgate catch mechanism on the truck T.

The forward side of the open frame 11 is provided with the cover 12 which extends across the large openings 22 in the frame 11. The cover member 22 illustrated in FIGS. 1–3 is an expanded metal screen which defines a series of air passage openings 30 therethrough. The air passage openings 30 in the screen 12 are relatively small, usually about $1\frac{1}{4}$ by $2\frac{1}{2}$ inches as compared to the much larger openings 22 in the frame 11, yet the thickness of the material forming the expanded metal screen, normally around 11 gauge sheet material, is sufficiently thin to keep the frontal surface area of the screen 12 at a minimum thereby keeping the air drag associated with the cover screen 12 at a minimum. This allows the air to flow through the cover screen 12 and the frame 11 without any significant air drag being created. It is further to be understood that the cover screen 12 may be made using a number of different constructions such as an open mesh wire screen, perforated plates and others. One significant advantage of the expanded metal type cover screen 12 is that the screen is relatively strong in a direction perpendicular to the plane of the screen, yet a major portion (normally at least 75%) of the cover screen is open to allow the passage of air therethrough. The fact that the expanded metal type cover screen 12 is strong in the direction perpendicular to the plane of the screen allows the tailgate construction 10 to be loaded when the tailgate is in its lowered open position as well as retain heavy articles in the cargo compartment CC when the tailgate construction is in its closed position as seen in the figures. Using an expanded metal cover screen 12, fuel economy has been increased 4–6 miles per gallon.

A modification of the tailgate construction of FIGS. 1–3 is shown in FIG. 4 and has been designated generally by the reference numeral 10′. Those components of the tailgate construction 10′ common to the tailgate construction 10 have the same reference numerals applied thereto. The tailgate construction 10 additionally includes closure means 31 for closing the air passage openings 30 through the cover screen 12 so that the tailgate construction 10′ can be used in a solid condition for hauling small granular cargo which would pass through the air passage openings 30 in the cover screen 12. The closure means 31 includes a thin rectilinear cover plate 32 which is positioned between the screen and the interior of the cargo compartment CC by support flanges 34 as seen in FIG. 4. The top of the cover plate projects above the upper tubular edge member 19 as seen in FIG. 4 and is provided with a handle flange 35 integral with the top edge of the cover plate 32 so that the handle flange 35 can be gripped to remove the cover plate 32 by pulling upwardly thereon. The cover plate 32 is shown in its closed position in FIG. 4. It is understood that the cover screen 12 is again exposed when the cover plate 32 is slipped out of the support flanges 34. The cover plate 32 can be stowed in another position after it is removed from the tailgate construction 10′ until it is necessary to again close the air passage openings 30 through the tailgate construction 10′. It will be noted that since the cover plate 32 passes immediately forward of and in juxtaposition with the cover screen 12, the cover screen 12 serves to provide the necessary rigidity to the cover plate 32 to prevent its damage when the cargo compartment CC is loaded.

SECOND EMBODIMENT

A second embodiment of the tailgate construction is illustrated in FIGS. 5 and 6 and has been designated generally by the numeral 110. The tailgate construction 110 is to be used similarly to the tailgate construction 10 to close the tailgate opening TO at the rear end of the side walls SW forming the cargo compartment CC. The tailgate construction 110 includes an open frame 111 which is selectively closed by a movable shutter assembly 12.

The open frame 111 is similar to the open frame 11 with opposed, generally parallel end plates 115 with a forward edge 116 and a trailing edge 118. Upper and lower tubular edge members 119 and 120 extend between the end plates 115 parallel to each other to define a large opening 122 therethrough. While intermediate braces are not shown in the open frame 111, it is to be understood that such braces could be added by providing appropriate cutouts therein to permit the operation of the movable shutter assembly 112 as will become more apparent. The lower ends of the end plates 115 are provided with pivot connectors 124 similar to the connectors 24 on a tailgate construction 10 to pivot frame 111 in the tailgate opening TO. It will be noted that the pivot connectors 124 are for a slightly different pivot connection arrangement between the vehicle bed B and the tailgate construction 110. A closure mechanism 125 is provided on the end plates 115 for cooperation with a conventional closure bracket found on some types of pickup trucks T. The closure mechanism 125 includes tailgate closure bracket 126 which can be selectively connected to an appropriate closure bracket already existing on the truck T by the hook and chain assembly 128 seen in FIG. 5.

As best seen in FIG. 6, the movable shutter assembly 112 includes a plurality of movable shutters 130 which are pivotally connected to and extend horizontally between the end plates 115. While the particular shape of the shutters 130 may be varied, they are illustrated as thin rectilinear vane members 131 which have a length $L_1$ substantially equal to the length of the opening 122 between end plates 115 so that the shutters 130 will just fit between the end plates 115. While different numbers of shutters 130 may be used, three are illustrated in FIGS. 5 and 6. It will be seen that each of the plate members of the shutters 130 has an effective width $w_1$ greater than the distance $d_1$ between the pivot axes $A_S$ of the shutters 130. Thus, it will be seen that when the shutters 130 pivot downwardly toward their closed position, the bottom edge 133 of the vane members 131 will overlap the top edge 137 of the next lower vane member 131. The lowermost shutter 130 will overlap the lower edge member 120 as seen in FIG. 6. The upper outboard ends of each of the plate members 131 is provided with a pivot tab 132 arranged so that it is in juxtaposition with the inside surface of the end plates 115. Appropriate pivot bolts 134 connect each of the pivot tabs 132 to the end plates 115 so that the shutters 130 pivot about their respective horizontal shutter pivot axes $A_S$.

Each of the vane members 131 of the shutters 130 is provided with link mounting brackets 135 at opposite ends thereof which pivotally mount positioning links 136 thereon. Thus, it will be seen that a positioning link 136 is provided at opposite ends of each of the vane members 131. Each of the positioning links 136 has an effective length $L_2$ with a hook portion 138 at the projecting end thereof which can selectively engage apertured positioning brackets 139 and 140 mounted on the inside of the end plates 115 in operative association with the positioning links 136. The positioning brackets 139 are located so that when the shutters 130 are in a closed position (see the lower shutter in FIG. 6), the hook portions 138 on the positioning links 136 associated with each shutter 130 can engage the positioning brackets 139 to lock the shutters 130 in a closed position. The positioning brackets 140 are located so that when the shutters 130 are in their open position (see the uppermost shutter in FIG. 6) the hook portions 138 on positioning links 136 can engage the positioning brackets 140 to lock the shutters 130 in their fully open positions. It will further be noted that when the positioning links 136 are disconnected from both of the positioning brackets 139 and 140, the weight of the shutter 130 as seen in FIG. 6 moves the shutter toward its closed position, yet, the shutter 130 can pivot upwardly and rearwardly under the influence of the air flow thereby to open up and allow the air to flow therebetween.

It will be noted that the inboard side 141 of the shutters 130 face the interior of the cargo compartment CC and the forward end of the truck T so that the air flows against the shutters 130 from the left toward the right as seen in FIG. 6. Thus, it will be seen that when the positioning links 136 are disconnected from the positioning brackets 139 and 140, the force of the air against the shutters 130 will cause them to open sufficiently to allow the air to pass thereby. On the other hand, when it is necessary to haul cargo which is sufficiently small to pass between the shutters 130, the shutters 130 may be locked in their closed position using the hook portions 138 on positioning links 136 to connect them to the positioning tabs 139. The shutters 130 may be locked in their open position using the positioning brackets 140 to prevent any vibration of the shutters 130 as the air flows thereby while at the same time minimizing the air drag associated with tailgate construction 110. When the cargo compartment CC is only partly filled, it is only necessary to lock some of the lower shutters 130 in a closed position while the shutters 130 above the cargo can remain open to reduce air drag.

FIG. 7 shows a modification of the tailgate construction of FIGS. 5 and 6 and is designated generally by the numeral 110'. The various components of the tailgate construction 110' are the same as the components of the tailgate construction 110 and have the same reference numbers applied thereto. The shutter assembly 112 of the tailgate construction 110' is arranged so that it is a mirror image of the assembly 112 of the construction 110. In other words, the shutter assembly 112 of construction 110' is reversed end-to-end from assembly 112 of construction 110. Thus, instead of opening rearwardly and upwardly, they open forwardly and upwardly with a clockwise rotation as seen in FIG. 7. Thus, it will be seen that not only will the weight of each individual shutter 130 force it toward a closed position, the force of the air on the forward surface 144 facing the cargo compartment does likewise. The force of the cargo on surfaces 144 moves the shutters 130 toward their closed positions. Therefore, the shutters 130 must be held in their low drag open positions by the hook portions 138 on the positioning links 136. The advantage of this arrangement is that the vane members 131 can be more heavily loaded without having to reinforce the positioning links.

FIG. 8 shows a second modification of the tailgate construction of FIG. 6 and is designated generally by the numeral 210. The tailgate construction 210 is a combination of the constructions of FIG. 2 and FIG. 6. The tailgate construction 210 is to be used similarly to the tailgate construction 10 or 110 to close the tailgate opening TO at the rear end of the side walls SW forming the cargo compartment CC. The tailgate construction 210 includes an open frame 211 which is provided with a cover screen 212 and is selectively closed by a movable vane assembly 214.

The open frame 211 is similar to the open frame 111 with opposed, generally parallel end plates 215 with a forward edge 216 and a trailing edge 218. Upper and lower tubular edge members 219 and 220 extend between the end plates 215 parallel to each other to define a large opening 222 therethrough. The lower end of the end plates 215 are provided with appropriate pivot connectors 224 to mount the tailgate construction 210 in the tailgate opening TO. An appropriate closure mechanism (not shown) is provided to hold the tailgate closed.

The cover screen 212 corresponds to the screen 12 on the tailgate construction 10 and is expanded metal to provide air passages 229 therethrough. As with construction 10, the passages 229 allow the air to freely pass therethrough and thus minimize the air drag by the tailgate construction 210.

The movable vane assembly 214 includes a movable shutter 230 which is pivotally connected to and extends horizontally between the end plates 215 just below the upper edge member 219. The shutter 230 is a thin rectilinear vane member 231 which has a length substantially the length of the opening 222 between end plates 215 and a width $W_1'$ substantially the height of opening 222 so that the shutter 230 will just fit between the end plates 215 and the upper and lower edge members 219 and 220. The upper outboard ends of the vane member 231 is provided with pivot tabs 232 arranged so that they are in juxtaposition with the inside of the end plates 215 just below the upper edge member 219. Appropriate pivot bolts 234 connect each of the pivot tabs 232 to the end plates 215 so that the shutter 230 pivots about the shutter pivot axis $A_S$. The vane member 231 is provided with locating brackets 235 at opposite ends thereof for use with locking pins 236 to locate the position of vane member 231. Complimentary locking brackets 238 are provided on frame 11 to cooperate with brackets 235 and pins 236 to selectively lock vane member 231 in its closed position behind the screen 212 shown by solid lines in FIG. 8 or in its open position shown by dashed lines in FIG. 8. Thus, the vane member 231 can be locked in its closed position when the cargo would pass through the screen 212 and opened when empty or the cargo will not pass through screen 212.

THIRD EMBODIMENT

FIGS. 9 and 10 illustrate a third embodiment of the invention designated 310 which is based on a conventional tailgate construction. The tailgate construction 310 is for use similarly to the other embodiments of this application to be pivoted about axis $A_T$ to selectively close the tailgate opening TO in the truck T of FIG. 1.

The tailgate construction 310 has a pair of end plates 315 joined by an outer skin 316 which extends around the periphery of the end plates 315. Thus, it will be seen that the outer skin 316 has a front section 318 facing the cargo compartment CC and an opposed rear section 319. The front and rear sections 318 and 319 may be respectively recessed at 320 and 321 as is well known in the tailgate art. A common cutout 322 is formed through the front and rear sections 318 and 319 with a height $H_C$ and a length $L_C$. The end plates 315 are provided with appropriate pivot connectors 324 to connect the tailgate construction 310 to the truck T and an appropriate latch mechanism 325 is provided to hold the tailgate construction in its closed position.

A screen member 312 of a construction similar to the cover member 12 is attached in the cutout 322. The screen member 312 is of expanded metal with air passages 330 therethrough so that the air can flow freely through the cutout 322.

A door 335 is provided at the front end of the cutout 322 to selectively cover the cutout and screen member 312. The door 335 is pivoted on the front section 318 of skin 316 in recess 320 as seen in FIG. 10 about door Axis $A_D$. When the door 335 is closed as shown by solid lines in FIG. 10, it blocks the cutout 322 but can be pivoted upwardly to the open position shown by dashed lines in FIG. 10 to allow the air to freely pass through the cutout 322 and screen member 312. When the door 335 is open, the air drag associated with the tailgate construction 310 is reduced. Appropriate catch mechanisms 336 may be provided to alternatively keep the door 335 in its open or closed position.

In summary, then, it will be seen that the invention provides a tailgate construction which significantly reduces the air drag by the tailgate and thus significantly increases the effective fuel economy of the vehicle. Further, the tailgate construction does not limit the type of cargo which can be transported by the vehicle.

What is claimed as invention is:

1. A low drag tailgate construction for attachment in the tailgate opening at the trailing end of an open top cargo compartment of a vehicle in replacement of the conventional tailgate normally associated therewith, said tailgate comprising:

an open frame defining an air opening therethrough having a peripheral configuration corresponding generally to the configuration of the tailgate opening to the open top cargo compartment of the vehicle, said open frame pivotally connected to the trailing end of the vehicle in lieu of the conventional tailgate for selectively extending over the tailgate opening at the trailing end of the open top cargo compartment while permitting air to freely flow from the cargo compartment through the air opening when the vehicle is in forward motion;

a screen member defining a plurality of air passages therethrough mounted on said open frame and extending over said air opening, the size of any individual one of said air passages sufficiently small to retain the cargo in the cargo compartment of the vehicle, yet a major portion of the area of said air opening is defined by said air passages to permit air to freely flow therethrough from the cargo compartment when the vehicle is in forward motion to reduce the air drag associated therewith; and closure means for selectively closing said air passages through said screen member to permit cargo smaller than said air passages such as particulate material to be carried in the cargo compartment, said closure means including a cover plate having a size sufficient to cover all of said air passages through said screen member and locating means for removably locating said cover plate with respect to said screen member to substantially prevent the passage of air through said screen member.

2. A low drag tailgate construction for attachment in the tailgate opening at the trailing end of an open top cargo compartment of a vehicle in replacement of the conventional tailgate normally associated therewith, said tailgate comprising:

an open frame defining an air opening therethrough and having a peripheral configuration corresponding generally to the configuration of the tailgate opening to the open top cargo compartment of the vehicle, said open frame pivotally connected to the trailing end of the vehicle in lieu of the conventional tailgate for selectively extending over the tailgate opening at the trailing end of the open top cargo compartment while permitting air to freely flow from the cargo compartment through the air opening when the vehicle is in forward motion; and cover means including a shutter assembly mounted on said open frame and extending over said air opening, said shutter assembly having a closed position substantially preventing the air from passing through said air opening in said tailgate construction and an open position permitting the air to freely pass therethrough to reduce the air drag associated therewith, said shutter assembly including a plurality of shutters pivotally mounted on said open frame about spaced apart shutter pivot axes, said shutters sized so that said shutters overlap each other in the closed position to prevent the passage of air therebetween, and said shutters arranged so that the force of the air thereagainst when the vehicle is moving urges said shutters toward the open position.

3. The low air drag tailgate construction of claim 2 further including locking means for selectively locking said shutters in the closed position.

4. The low air drag tailgate construction of claim 2 further including locking means for selectively locking said shutters in the open position.

5. The low drag tailgate construction of claim 2 wherein said shutter members are generally horizontally oriented and generally parallel to each other.

6. The low drag tailgate construction of claim 2 wherein said shutter members are arranged so that said air passages constitute at least a major portion of the area of said air opening through said open frame.

7. A low air drag tailgate construction for attachment in the tailgate opening at the trailing end of an open top cargo compartment of a vehicle in replacement of the conventional tailgate normally associated therewith, said tailgate comprising:

an open frame defining an air opening therethrough and having a peripheral configuration corresponding generally to the configuration of the tailgate opening to the open top cargo compartment of the vehicle, said open frame pivotally connected to the trailing end of the vehicle in lieu of the conventional tailgate for selectively extending over the tailgate opening at the trailing end of the open top cargo compartment while permitting air to freely flow from the cargo compartment through the air opening when the vehicle is in forward motion; and cover means mounted on said open frame over said air opening for retaining cargo in the cargo space while permitting air to flow therethrough to reduce the air drag associated therewith, said cover means including a plurality of shutter members extending across said air opening and defining air passages therebetween through which the air can freely flow when the vehicle is in forward motion, said air passages sufficiently small to retain cargo in the cargo compartment, said shutter members movably mounted on said open frame for movement between an open position defining said air passages therebetween and a closed position in which said air passages are blocked by said shutter members to permit small size cargo such as particulate material to be carried in the cargo compartment, said cover means further including closure means for normally urging said shutter members toward their closed position.

8. The low drag tailgate construction of claim 7 wherein said shutter members are arranged so that the force of the air thereagainst when the vehicle is moving forwardly urges said shutter members toward the open position.

9. The low drag tailgate construction of claim 7 wherein said closure means comprises orienting said shutter members so that the weight of said shutter members urges them toward their closed position.

10. A low air drag tailgate construction for attachment in the tailgate opening at the trailing end of an open top cargo compartment of a vehicle in replacement of the conventional tailgate normally associated therewith, said tailgate comprising:

an open frame defining an air opening therethrough and having a peripheral configuration corresponding generally to the configuration of the tailgate opening to the open top cargo compartment of the vehicle, said open frame pivotally connected to the trailing end of the vehicle in lieu of the conventional tailgate for selectively extending over the tailgate opening at the trailing end of the open top cargo compartment while permitting air to freely flow from the cargo compartment through the air opening when the vehicle is in forward motion; and cover means mounted on said open frame over said air opening for retaining cargo in the cargo space while permitting air to flow therethrough to reduce the air drag associated therewith, said cover means including a plurality of shutter members extending across said air opening and defining air passages therebetween through which the air can freely flow when the vehicle is in forward motion, said air passages sufficiently small to retain cargo in the cargo compartment, said shutter members movably mounted on said open frame; and adjustment means for selectively moving said shutter members to change the size of said air passages therebetween.

11. A low air drag tailgate construction for attachment in the tailgate opening at the trailing end of an open top cargo compartment of a pickup truck in replacement of the conventional tailgate normally associated therewith by mounting on the tailgate mounting brackets on the pickup truck, said tailgate comprising:

an open frame defining an air opening therethrough and having a peripheral configuration corresponding generally to the configuration of the tailgate opening to the open top cargo compartment of the vehicle, said open frame pivotally connected to the trailing end of the pickup truck in lieu of the conventional tailgate for selectively extending over the tailgate opening at the trailing end of the open top cargo compartment while permitting air to freely flow from the cargo compartment through the air opening when the vehicle is in forward motion; said open frame comprising a pair of spaced apart, parallel generally vertically extending end plates having upper and lower ends; an upper, generally horizontal, tubular edge member extending between and connected to the upper ends of said end plates; a lower, generally horizontal, tubular edge member extending between and connected to said end plates adjacent the lower ends thereof; and a pair of pivot connectors attached to the lower ends of said end plates below said lower tubular edge member and coaxially aligned along a common tailgate pivot axis generally parallel to said upper and lower tubular edge members, said pivot connectors adapted to pivotally connect said open frame to the tailgate mounting brackets on the pickup truck so that said open frame can be pivoted upwardly to a closed position whereby said end plates extend along opposite sides of the tailgate opening, said upper tubular edge member extends along the upper edge of the tailgate opening, and said lower tubular edge member extends along the lower edges of the tailgate opening, said open frame defining said air opening therethrough between said end plates, and said upper and lower tubular edge members, and cover means mounted on said open frame over said air opening for retaining cargo in the cargo space while permitting air to flow therethrough to reduce the air drag associated therewith, said cover means including a plurality of shutter members extending across said air opening and defining air passages therebetween through which the air can freely flow when the vehicle is in forward motion, said air passages sufficiently small to retain cargo in the cargo compartment.

* * * * *